United States Patent [19]
Arekapudi et al.

[11] Patent Number: 5,178,009
[45] Date of Patent: Jan. 12, 1993

[54] INTEGRAL TEMPERATURE AND LIQUID LEVEL SENSOR AND CONTROL

[75] Inventors: Anil K. Arekapudi; Donald G. Bryan, Jr.; Thomas Holden, all of St. Louis, Mo.

[73] Assignee: Industrial Engineering and Equipment Company, St. Louis, Mo.

[21] Appl. No.: 705,011

[22] Filed: May 21, 1991

Related U.S. Application Data

[62] Division of Ser. No. 490,472, Mar. 8, 1990, Pat. No. 5,056,363.

[51] Int. Cl.$^5$ .................... G01F 23/22; G08B 21/00
[52] U.S. Cl. .................................. 73/292; 73/295; 137/389; 137/558; 374/142
[58] Field of Search .............. 73/292, 295; 137/389, 137/391, 392; 340/620; 374/142

[56] References Cited

U.S. PATENT DOCUMENTS

| | | |
|---|---|---|
| 3,018,322 | 1/1962 | Goellner . |
| 3,166,485 | 1/1965 | Lloyd . |
| 3,301,055 | 1/1967 | Williams et al. . |
| 3,306,109 | 2/1967 | Caparone . |
| 3,363,466 | 1/1968 | Guidi . |
| 3,461,446 | 8/1969 | Sergeant . |
| 3,537,085 | 10/1970 | Mayer et al. ............. 73/292 X |
| 3,653,262 | 4/1972 | Ehrenfried et al. ............. 73/292 |
| 3,863,210 | 1/1975 | Roland et al. . |
| 3,977,851 | 8/1976 | Toya . |
| 4,024,725 | 5/1977 | Uchida et al. . |
| 4,135,186 | 1/1979 | Minorikawa et al. ............. 73/295 X |
| 4,139,762 | 2/1979 | Pohrer et al. ............. 137/392 X |
| 4,178,802 | 12/1979 | Yamamoto . |
| 4,277,773 | 7/1981 | Blatnik . |
| 4,334,410 | 6/1982 | Drumare ............. 137/392 X |
| 4,390,290 | 6/1983 | O'Neill et al. . |
| 4,416,153 | 11/1983 | Williams ............. 137/392 X |
| 4,424,683 | 1/1984 | Manson . |
| 4,590,797 | 5/1986 | Beaubatie et al. . |
| 4,630,477 | 12/1986 | Murtland, Jr. ............. 73/295 |
| 4,638,291 | 1/1987 | Puscasu . |
| 4,660,026 | 4/1987 | Chandler . |
| 4,777,821 | 10/1988 | Gerve . |
| 4,825,695 | 5/1989 | Ohtani . |
| 4,924,678 | 5/1990 | Ito . |
| 4,947,653 | 8/1990 | Day et al. . |

FOREIGN PATENT DOCUMENTS

2022844 6/1978 United Kingdom .

Primary Examiner—Daniel M. Yasich
Attorney, Agent, or Firm—Heller & Kepler

[57] ABSTRACT

A temperature controller with an integral liquid level control is contained within one unit. The unit consists of an electrical and heat conductive housing, which serves as a first electrode of the liquid level sensor. A metal clamp and a means to attach the housing to the liquid vessel is insulated from the housing and serves as a second electrode. The electrodes are connected in an electrical circuit such that when the electrodes are immersed within a conductive liquid, the resistance between the electrodes is reduced and a current is allowed to flow. A temperature sensor, such as a thermistor, RTD, or thermocouple, is contained within the housing. The housing conducts heat from the housing environment for radiation within the housing.

14 Claims, 8 Drawing Sheets

INTEGRAL TEMPERATURE AND LIQUID LEVEL SENSOR AND CONTROL

This is a divisional of copending Ser. No. 07/490,472 filed on Mar. 8, 1990 now U.S. Pat. No. 5,056,363 issued Oct. 15, 1991.

BACKGROUND OF THE INVENTION

The present invention relates in general to a combined temperature and liquid level sensor and control and pertains, more particularly, to a combined sensor for providing a dual control signal directed to form a single unit that may include a desired, inherent time delay to prevent rapid relay cycling when a liquid moves. The parent application, Ser. No. 07/490,472, was allowed on Mar. 12, 1991, and issued Oct. 15, 1991 as U.S. Pat. No. 5,056,363.

With the conventional sensor and control devices for temperature control, different kinds of sensors may be enclosed in a housing well and immersed in a liquid whose temperature is being controlled. The conventional liquid level sensors and controls use electrical probes immersed in a liquid which conducts an electrical current.

These conventional sensors and controls are disclosed in a number of patents. The Ohtani patent, U.S. Pat. No. 4,825,695, reveals a liquid level sensor mounted on a frame which restricts the movement of the sensor. The Gerve patent, U.S. Pat. No. 4,777,821, reveals a sonic sensor for detecting a liquid level within a measuring chamber and includes a gas thermometer for detecting the temperature of a liquid in a measuring chamber. This liquid provides a reservoir for measuring a temperature difference.

The Chandler patent, U.S. Pat. No. 4,660,026, reveals a fluid state detector and includes two thermistors. One thermistor is exposed to air and another thermistor detects a liquid level. A resistance change is detected when the thermistor is immersed within a liquid. The Marthland patent, U.S. Pat. No. 4,630,477, reveals a thermistor encapsulated within a corrosive resistant material. A change in resistance provides a measurement of a level of a corrosive liquid.

Both the Puscanser, U.S. Pat. No. 4,638,291, and the Blatnik, U.S. Pat. No. 4,277,773, patents reveal liquid level sensors utilizing electrical probes. Detection of a liquid level occurs when a conductive liquid immerses both probes, thereby providing a path for current to flow.

The Minorigaya patent, U.S. Pat. No. 4,135,186, reveals a combination liquid level and high temperature detecting apparatus including a thermistor in combination with a relay coil inside a casing. A variation in current value at the thermistor caused by liquid temperature variation is corrected by an associated relay and resistance variation. The liquid level apparatus is intended to provide accurate readings independent of liquid temperature variation and an excess temperature sensor.

Another patent, U.K Patent No. 2,022,844A, reveals a liquid level and temperature probe combination including a pair of leads and one thermistor providing liquid level sensing as a function of heat dissipation and another thermistor providing conventional thermistor temperature sensing, also as a function of heat dissipation.

Among the drawbacks of conventional devices is the need for two separate probes, one for temperature detection and one for liquid level detection. A single unit or probe house both the temperature sensing and liquid level sensing devices in the present invention. The temperature sensor can be a thermistor or other comparable devices, e.g., a thermocouple.

The level sensing means of a conventional device may utilize electrical contacts to sense a change in conductivity or resistance due to immersion within a conductive liquid. In conventional devices, it is also true that liquid splashing or rapid movement of the liquid may result in an incorrect liquid level signal.

Conventional devices include other drawbacks, including those resulting from a lack of adjustment means needed as a change in fluid electrical resistance occurs over time as contaminants build up in the fluid. Conventional liquid level sensors using alternating current sensors operating at standard frequencies of 50 or 60 HZ can cause rapid corrosion and corrosive build up on an exposed tip of a sensor housing or tube.

Accordingly, it is the object of the present invention to provide an improved integral liquid level and temperature sensor for detecting and providing suitable output signals for controlling the level and temperature of a liquid.

Another objective of the present invention is to provide an improved integral liquid level and temperature sensor that is economical and provides a single unit housing sensors for both level and temperature conditions.

A further objective of the present invention is to provide an improved integral liquid level and temperature sensor by combining the sensors for level and temperature. The sensor of this invention eliminates the need to penetrate a liquid vessel more than once for placement of sensors. This feature should result in an overall lower installation cost when compared to conventional devices.

Still another object of the present invention is to provide an improved integral liquid level and temperature sensor which reduces the effects of corrosion on the sensor body.

Still a further object of the present invention is to provide an improved integral liquid level and temperature sensor which incorporates an inherent time delay in a control circuit. The time delay acts to prevent rapid cycling of circuit control relays due to liquid movement.

Another object of the present invention is to provide an improved integral liquid level and temperature sensor which includes an inherent adjustment for different fluid resistivities. Thus, different sensors are not automatically required for use with different liquids.

A further object of the present invention is to provide an improved integral liquid level and temperature sensor that controls a heater as a result of two variables, i.e., both temperature and liquid level. Thus, catastrophic failure of over temperature and heater burn out may be prevented. The arrangement of the present invention provides an economic control not requiring two separate, independent controls.

Still another object of the present invention is to provide an improved integral liquid level and temperature sensor that operates with a relatively high frequency, e.g., 10K HZ or more. The high frequency, alternating current used to detect the liquid level substantially reduces the electrolysis effect, thereby reducing housing corrosion at the closed end exposed to the conductive liquid. Periodic cleaning or replacement of the sensor is significantly reduced.

SUMMARY OF THE INVENTION

To accomplish the foregoing and other objects of this invention there is provided a combined temperature and liquid level sensor in a single unit. The sensor for use in a vessel containing a conductive liquid comprises an electrical and heat conducting housing having an open end and a closed end. The housing is electrically insulated except for a portion of the closed end. The closed end is suitable for insertion into the liquid vessel containing the conductive liquid. An attachment means is provided for attaching the electrical insulator to the housing.

Conductive means are provided intermediate the housing and the attachment means. The conductive means maintains an electrical current flow when the housing is immersed in the conductive liquid within the vessel. A temperature sensing means is inserted into the open end of the housing. The temperature sensor output leads will extend outwardly from the housing, through the open end and to a suitable control circuit. The temperature sensor within the housing may be a thermistor, RTD or thermocouple depending on the use or desired characteristics of the temperature sensor portion.

In a preferred embodiment the level sensor consists of two electrodes the first of which is the metallic housing. The second electrode, insulated from the housing, may be a metal fitting which attaches the housing to a liquid vessel or a second housing over the housing.

These and other objects and features of the present invention will be better understood and appreciated from the following detailed description of preferred embodiments thereof, selected for purposes of illustration and shown in the accompanying drawings.

DETAILED DESCRIPTION

Referring now to the drawings there is shown preferred embodiments for the sensor and the controller of this invention. The sensors are described in connection with a vessel containing a conductive liquid, for example, cooling water in a cooling tower.

The sensor and controller combination of the present invention is particularly adapted for providing a liquid level and temperature related signal for use in controlling a heater and a refill valve (if provided) in an evaporative cooling tower and is characterized by the combination of the liquid level and temperature sensor in a single housing.

Figure 1:
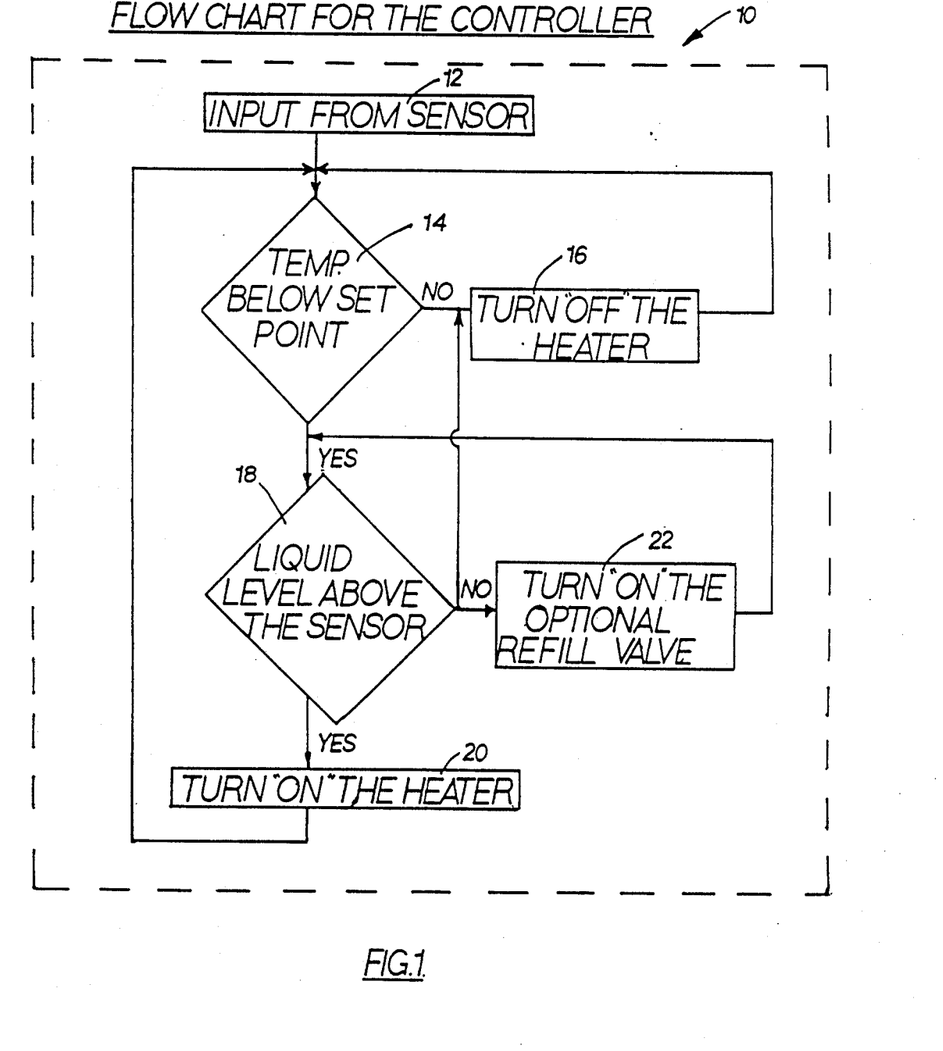
FIG. 1 is a flow chart of a preferred operation of the present invention.

The drawings show a block diagram in FIG. 1 in which a controller 10 receives an input 12 from a temperature sensor and a level sensor. The sensed temperature is compared to a set point 14 and if the temperature is above the set point 14, then the controller 10 de-energizes a relay 16 and turns the heater "off".

The liquid level sensor provides a sensed liquid level 18. If the liquid level is above the sensor, then the controller 10 responds and energizes another relay 20 for energizing the heater "on". If the liquid level is below the sensor, then an optional refill valve 22 is opened until the level sensor is immersed in liquid at which point the refill valve will be turned off. Also provided by the controller is a signal to turn off the heater in the event that the liquid level drops below the sensor.

If the sensed temperature is below the set point and the liquid level is below the sensor, then the heater cannot be energized. This feature of the present invention provides a heater control means that functions as a result of at least two variables, i.e., liquid temperature and liquid level. The dual control prevents catastrophic failure due to extreme liquid temperature and low liquid level, conditions which otherwise could readily result in heater burn out and failure.

Figure 5:
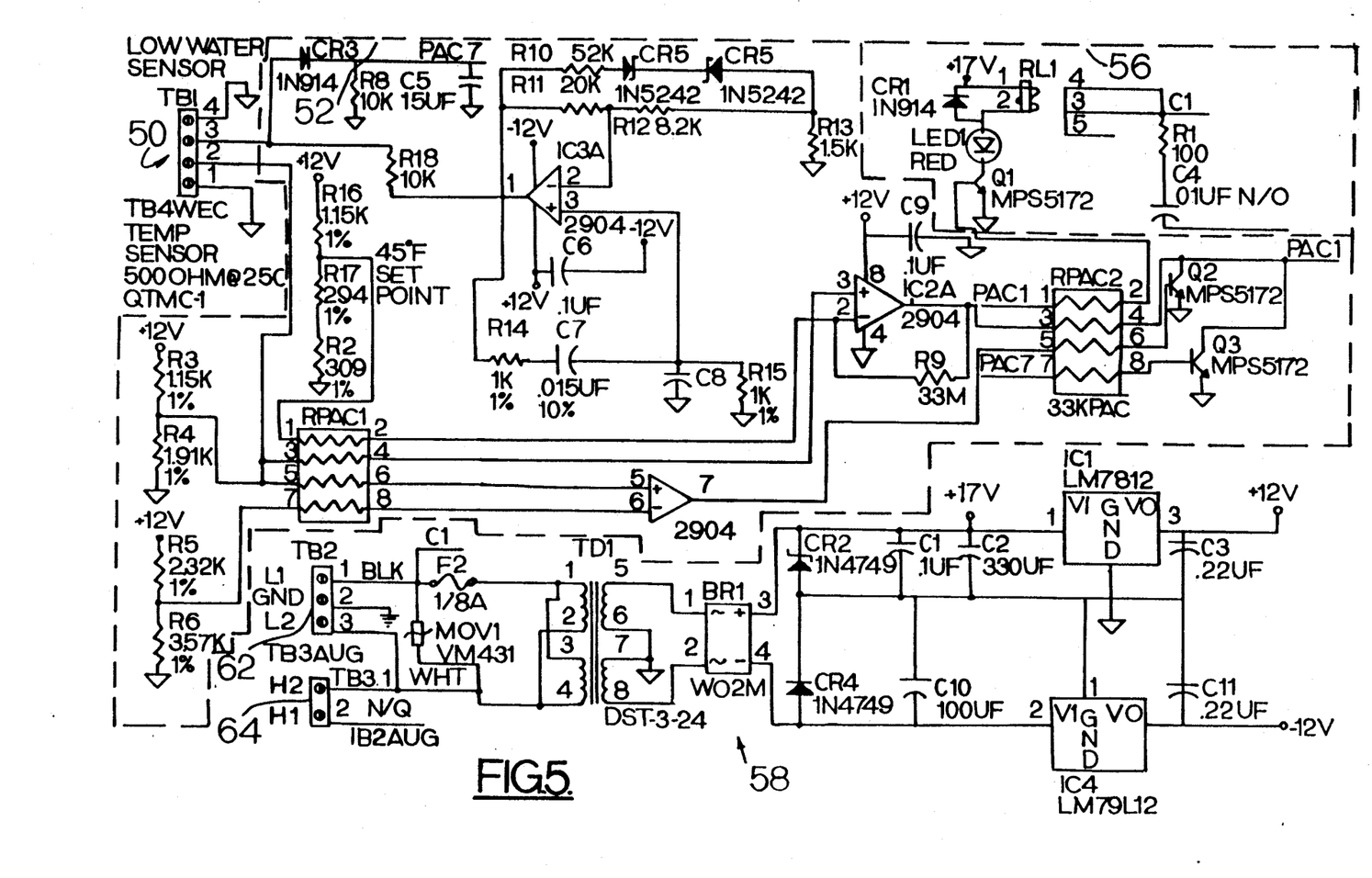
FIG. 5 is a wiring schematic illustrating one arrangement of the present invention.
Figure 6:
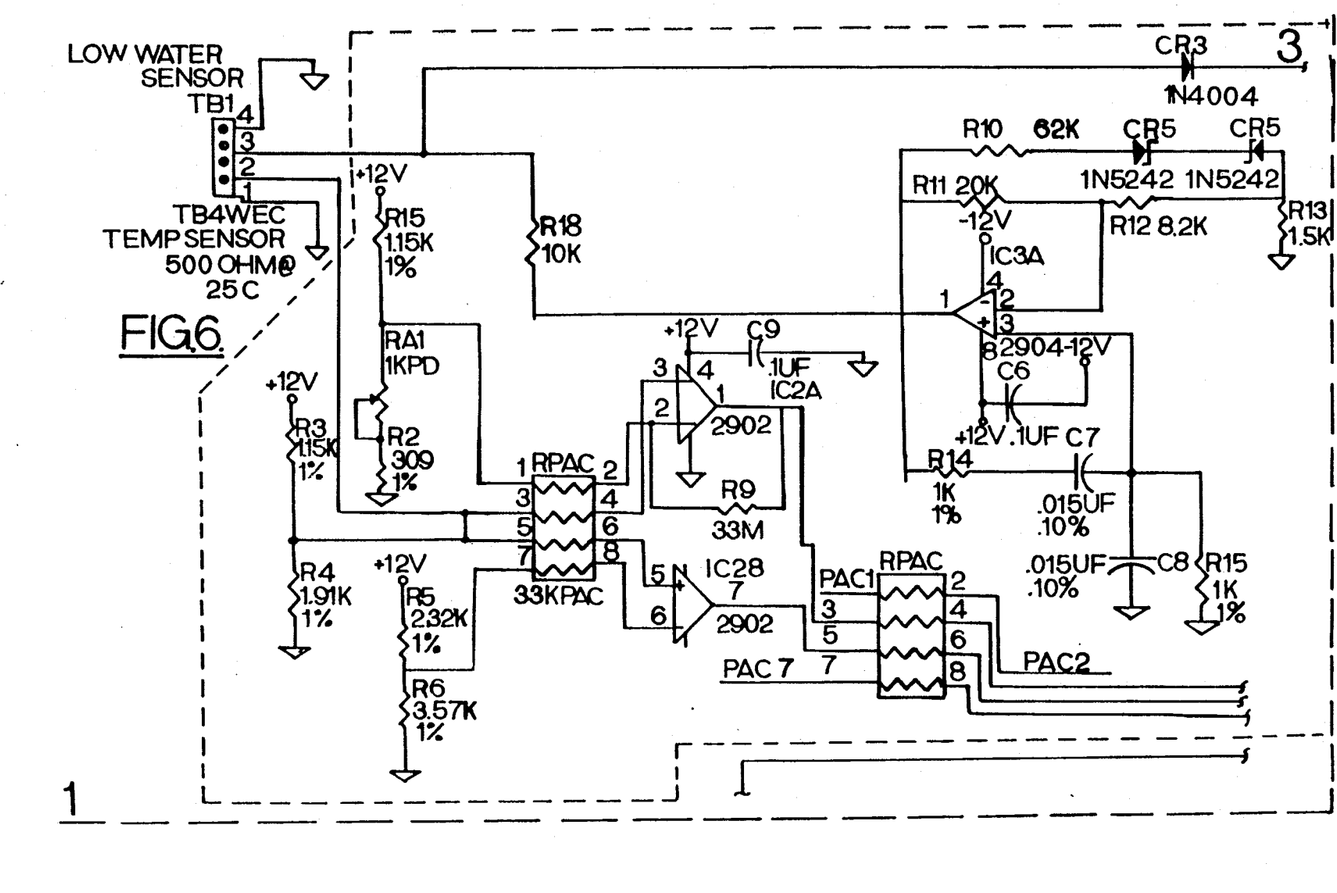
FIG. 6-6C are different sections another wiring schematic illustrating another preferred arrangement of the present invention.
Figure 6A:
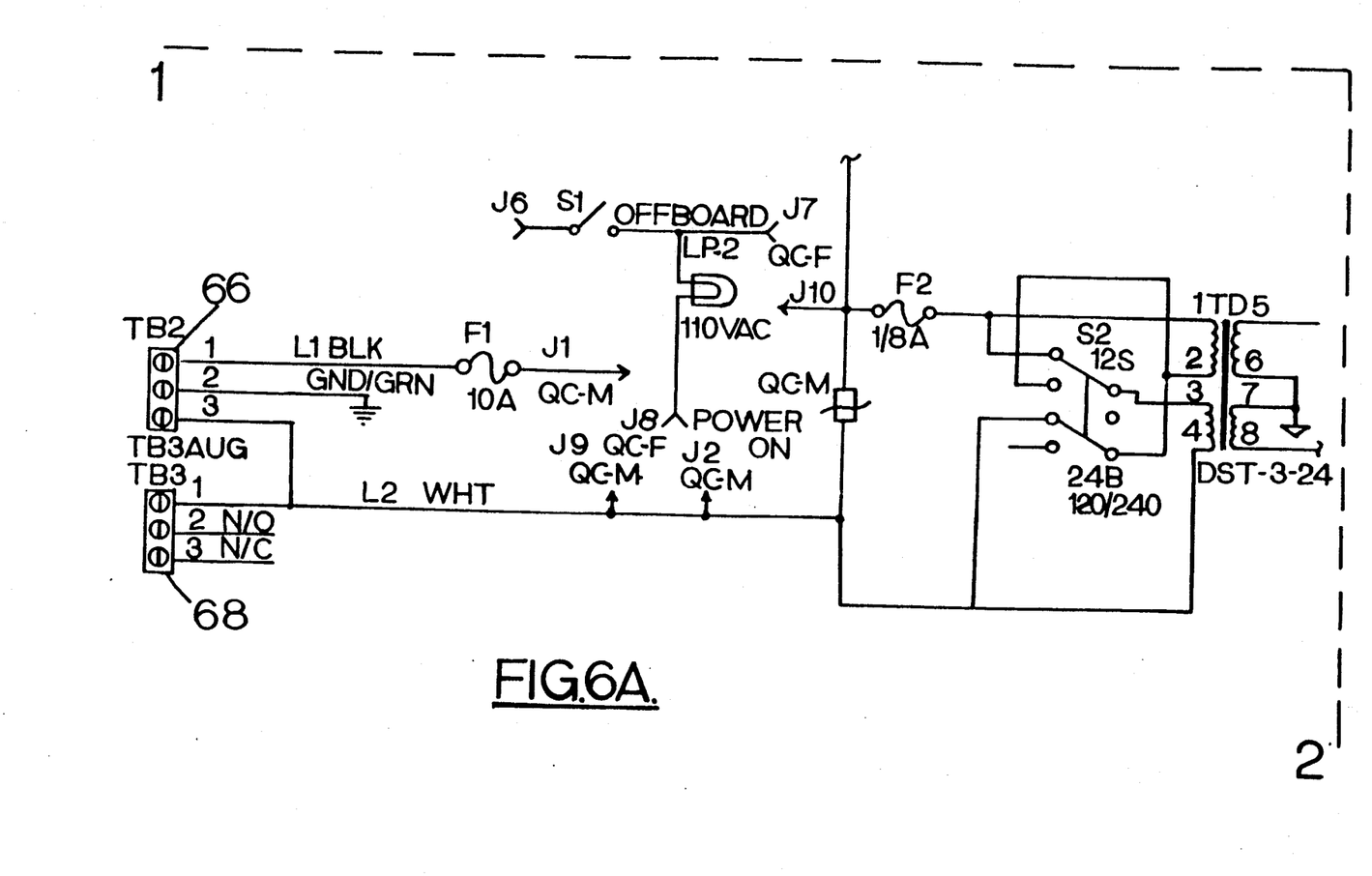
Figure 6B:
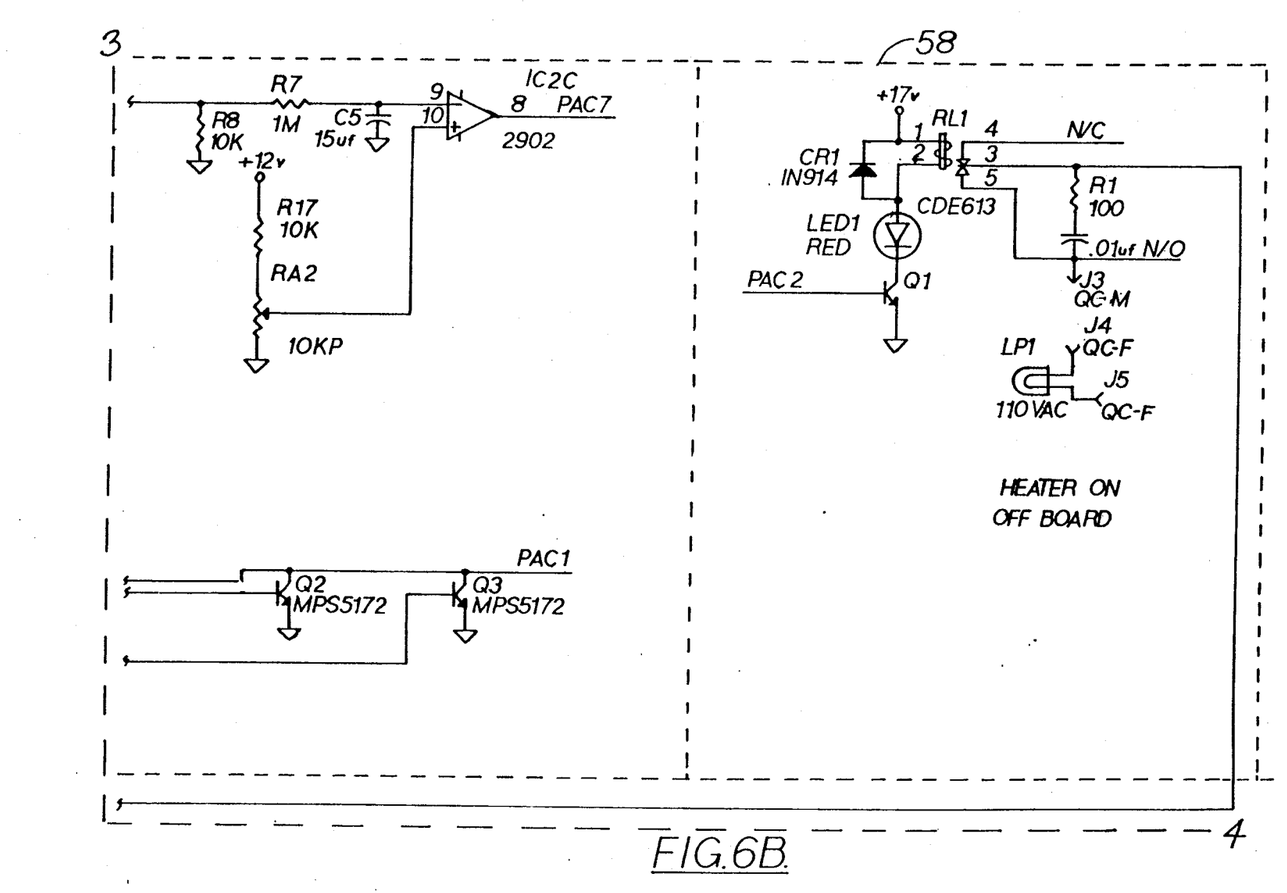
Figure 6C:
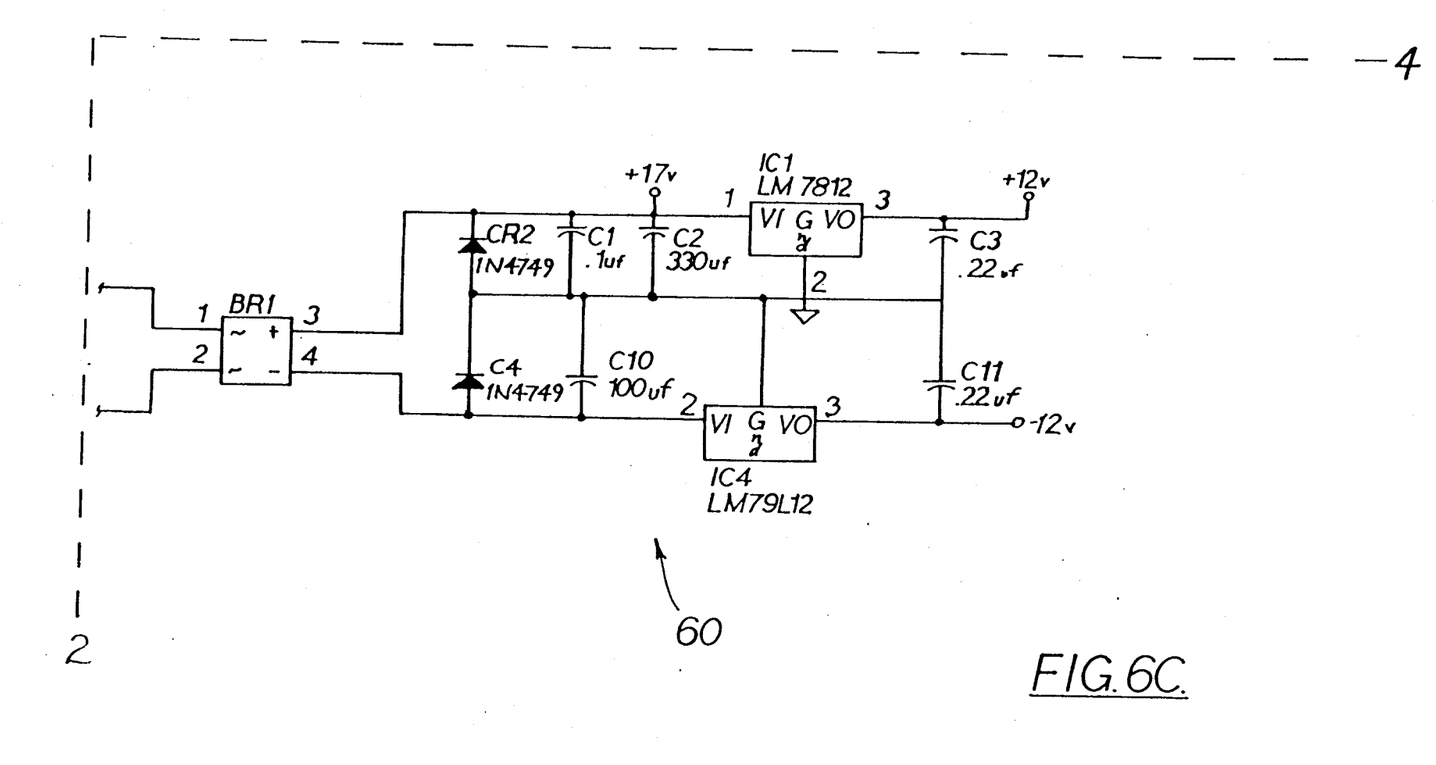

The block diagram illustrates that the controller recycles after each event "energizing" or "de-energizing" the heater relay, or the relay controlling the liquid valve. Preferred embodiments of a wiring schematic for a system incorporating the present invention illustrated in FIGS. 5 and 6-6C provide another manner of illustrating the present invention. The wiring schematic further illustrates the fashion in which the liquid and temperature sensor of this invention may be incorporated into a control system comprised in large part of otherwise conventional components.

Figure 2:
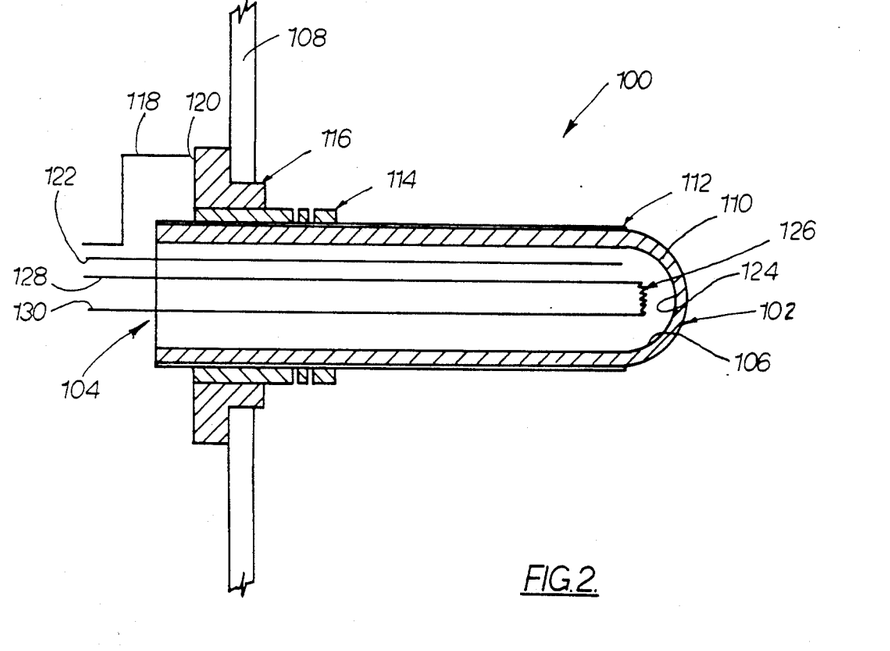
FIG. 2 is a schematic of a preferred sensor constructed in accordance with the present invention.
Figure 3:
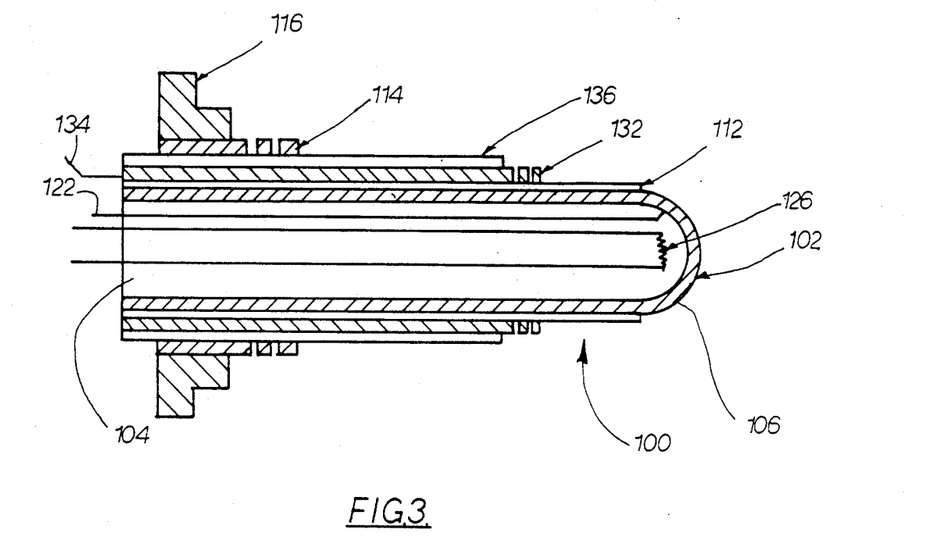
FIG. 3 is a schematic of another preferred embodiment constructed in accordance with the present invention.
Figure 4:
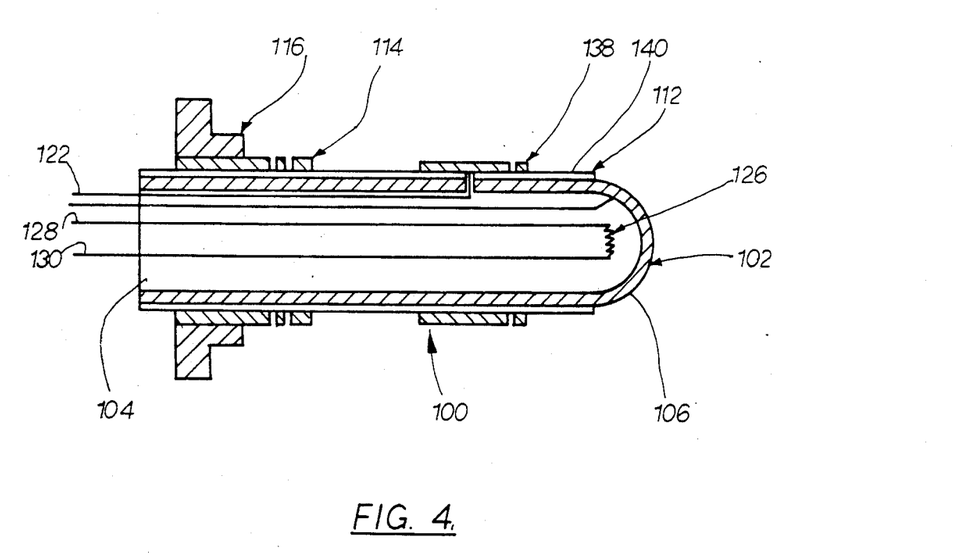
FIG. 4 is a schematic of yet another preferred embodiment constructed in accordance with the present invention.

Preferred embodiments of the integral temperature and liquid level sensor 100 for providing the signals for input to the controller 10, are illustrated in FIGS. 2-4. Referring now to FIG. 2 in particular, a housing 102 includes an open end 104 for receiving various associated components and a closed end 106, the latter for insertion into a liquid vessel, vat or container 108.

The housing 102 is an electrically conductive metallic tube. The tube or housing 102 having the open end 104 and the closed end 106 provided with a rounded closed end. The metallic housing 102 provides a first electrode 110 for the sensor 100. A non-metallic and non-conductive insulating material layer 112 wraps around the housing 102 while leaving the closed end 106 exposed. The insulator layer 112 insulates the metallic housing 102 from ground source and the liquid vessel.

A metal clamp or tube 114 covers the insulator layer 112. The metal clamp or tube 114 is preferably crimped in two places to secure it and the layer of insulator material 112 to the housing 102. A metal fitting 116 attaches securely around the metal clamp or tube 114 and provides means for attaching the sensor 100 to the liquid-filled vessel. In a preferred embodiment of the present invention, a metal, U-shaped fitting 116 threads into a suitable threaded opening in the liquid vessel 108.

An insulated wire 118 is attached, for example, with a welded or soldered connection 120 to the fitting 116. The wire 118 provides a ground or base and serves as a second electrode of the level sensing portion of sensor 100. Another insulated wire 122 is attached, for example, with a weld or soldered connection to an inside surface 124 of the housing 102. The housing 102 provides the first electrode of the level sensing portion of sensor 100.

The sensor 100 provides combined liquid level and temperature sensing features. Therefore, in accordance with the present invention a temperature sensing means 126 inserts into the open end 104 of the housing 102. In the described embodiments the temperature sensor is a thermistor 126. It will be understood by those skilled in the art that these other temperature sensors may be use depending upon the service desired and the particular application. It is known to substitute an RTD or thermocouple or other temperature sensor in suitable applications.

In the illustrated embodiment two electrical leads 128 and 130 are attached to the thermistor 126 and extend outward from the open end 104 of the housing 102. Therefore, it is understood that there is provided means for connecting the thermistor 126 positioned within the housing 102 and the controller 10. The housing 102 may be filled with an electrically non-conductive but heat conductive material in a preferred embodiment.

Two additional embodiments will now be briefly described for purposes of clarity and toward a further understanding of the inventive features of the present invention.

Another preferred embodiment of the sensor 100 of the present invention is illustrated in FIG. 3, and includes the housing 102, insulation layer 112, thermistor 126, insulated wire member 122 and electrical leads 128 and 130 substantially identical to the embodiment described with respect to FIG. 2. In the construction of this embodiment another housing 132 wraps or surrounds the insulator material layer 112. The second housing 132 provides another electrically conductive metal member and may be similar or identical to the housing 102.

The closed end 106 of the housing 102 and a portion of the insulator layer 112 are exposed in this embodiment. Another insulated wire 134 is attached or connected by a soldered or welded connection to the second housing 132. Thus, the second housing becomes an electrode for the level sensor portion of the sensor 100. The second housing may be crimped or in some other manner firmly attached or held in position over the insulator layer 112 and the housing 102.

Another insulator 136 provides an electrically non-conductive material that wraps or surrounds the second housing 132. A portion of the second housing 132 remains exposed and provides another electrode for the level sensor portion of sensor 100.

The metal clamp or tube 114 and metal fitting 116 are substantially the same in both of the described embodiments, except that the second embodiment does not include the insulated wire member 118. This embodiment is preferred if the container 108 is made out of a non-conductive material.

Still another preferred embodiment of the sensor 100 of the present invention is illustrated in FIG. 4, and includes the housing 102, insulation layer 112, thermistor 126, insulated wire member 122, electrical leads 128 and 130, and metal clamp or tube 114 and metal fitting 116 substantially identical to the embodiment described with respect to FIGS. 2 and 3, above.

In the construction of this embodiment another housing 138 wraps or surrounds the insulator material layer 112 and between the metal clamp or tube member 114 and the end of the insulator 112. The second housing 138 provides another electrically conductive metal member and may be a similar or an identical material as the housing 102.

The metal clamp or tube member 114 wraps around the insulator layer 112 so as to expose an intermediate portion of the insulator material layer 112. A portion of insulator material 112 intermediate the metal clamp or tube member 114 and the other housing member 138 remains exposed as does another portion 140 of the insulator material 112 near the closed end 106 of the sensor 100.

The insulated wire member 122, in this embodiment extends into the open end 104 of the housing 102 and penetrates by suitable openings the housing 102, the insulator material layer 112 and terminates in a connection to the inside of the second housing member 138. The housing members 102 and 138 provide the liquid level electrodes for this embodiment of the present invention.

In operation, in connection with the liquid level and temperature sensor illustrated in the block diagram and the wiring schematic for an application previously mentioned for use in connection with a vessel containing a conductive liquid, for example, cooling water in a cooling tower each embodiment of the sensor 100 described includes the two electrodes. The liquid level is detected by monitoring a resistance between these electrodes.

It will be understood that when both electrodes are exposed to air, then the electrical resistance will be considerable, suggestive of an open circuit. Similarly, when the electrodes are immersed in the particular fluid, then the electrical resistance between the electrodes decreases significantly. Typical resistance values in ohms range from approximately 1.7M ohms in air to approximately 300K ohms in liquid, for example, water in an evaporative cooling tower.

These values will vary depending upon the conductivity of the liquid and are included here for example only. Each sensor and control application typically requires an evaluation of the environment in which the sensor will be used. The component values, e.g., resistors, represented in FIGS. 5 and 6 pertain to an application in which the aforesaid resistance values (air and evaporative cooling tower water) may be encountered.

The temperature sensing operation of the sensor 100 operates in the following manner. Heat is conducted through the housing 102 from a surrounding environment to the inside of the housing 102 until an equilibrium is achieved. The particular thermistor 126 located within the housing 102 responds by providing a suitable signal, as is well known to those skilled in the art, corresponding to the sensed temperature. The signal is transmitted by means of leads 128 and 130 to the controller 10.

The present invention provides for reduced corrosion of the sensor and sensor components. In conventional controls, electrical power is provided as alternating current at typical frequencies of 50 or 60 HZ (hertz). These frequencies, when used with the level sensor 100 may cause corrosion and build-up on the housing 102 due to electrolysis depending on the characteristics of any contaminants in the liquid. It is understood that electrolysis may also be effected by the level of contaminants in the liquid.

It is expected that the use of a high frequency alternating current, approximately 10K HZ or more, substantially reduces the effect of electrolysis. This has the beneficial effect of reducing housing corrosion and corrosive buildup on the housing. This in turn substantially eliminates or at least significantly reduces the need for sensor replacement or periodic cleaning of the sensor portions susceptible to corrosion and corrosive build up.

It will be understood that a particular optimum operating frequency for a sensor will necessarily depend on a combination of factors, such as type of liquid and contaminants contained therein, determined from an evaluation of a particular application for the present invention.

In another embodiment of the present invention, a time delay may be incorporated into the controller 10. One purpose of the time delay is to counteract false signals resulting from splashing or rapid movement of the liquid. It is preferred that the time delay is adjustable for providing flexibility in the application of the present invention.

The size of the vessel or the incorporation of baffles into the vessel or the location of a fill valve near the sensor may effect the amplitude and frequency of waves or splashing liquid. A longer time delay is desirable for waves, splashing, or rapid movements of liquid having relatively longer time durations.

In another embodiment, it is contemplated that the electrical resistance of the liquid could change over an extended period due to additional or unforseen contamination or changes in the liquid's characteristics over time.

Furthermore, it is known that conductivity or electrical resistance also varies between liquids. Therefore, the controller 10 may be provided with the capability to adjust its accuracy as a function of the varying resistance of the liquid. This eliminates or reduces the need for replenishing the liquid more frequently and using different sensors for different liquids.

Typical wiring schematics are illustrated in FIGS. 5 and 6-6C, and the present invention will now be described by way of the functional aspects of the schematic. It will be understood by one skilled in the art that conventional components are utilized to provide a desired control circuit. Therefore, for purposes of clarity, the individual components are known and need not be described separately. It will be further understood that alternative components are available to one skilled in the art.

A terminal strip 50 provides a connection between the temperature and level sensors incorporated in the sensor 100 of the present invention and a power source. As previously described, a high frequency alternating current, preferably approximately 10K Hz and low voltage, sensor input is preferred. The control circuit provides for a fixed set point as indicated by conventional components in block 52 of FIG. 5 and an adjustable set point as indicated by an adjustable resistance as indicated by conventional component symbols in block 54 of FIG. 6.

A timer function is provided by the components in block 54 in order to adjust for fluctuations in the splashing and potential wave action in a particular vessel or vat arrangement as previously discussed.

A heater relay control block 56 activates the heater the when fluid temperature drops below the set point. In the preferred embodiment illustrated in FIG. 5, the temperature set point is 45° F. and it will be understood that other suitable set points may be provided. In the embodiment illustrated in FIG. 6C a heater relay control block 58 also includes an additional status light, preferably remote mounted for operator convenience.

A suitable power supply 58 and 60 is provided for both illustrated embodiments. The FIG. 6 embodiment includes a power status light. Both embodiments include associated refill valve and heater power supply terminal strips 62, 64 and 66, 68, respectively. Additionally, FIG. 6 incorporates a manual switch between the power supply and the power supply terminal strips.

Consideration of the block diagram of FIG. 1 and the wiring schematics of FIGS. 5 and 6-6C will further reveal the heater and refill valve control provided by the present invention. As illustrated in Table 1, a heater can be energized when the liquid temperature is below the set point and the liquid level is above the sensor. The refill valve, if provide, can only be energized in one condition, that is if the liquid temperature is below set point and the liquid level is not above the sensor. These conditions are illustrated in FIG. 1.

From the foregoing description, those skilled in the art will appreciate that all of the objects of the present invention are realized. An improved integral liquid level and temperature sensor has been shown and described for providing the desired detecting and suitable output signals for controlling the level and temperature of a liquid. A single unit houses sensors for both level and temperature conditions.

The sensor of this invention eliminates the need to penetrate a liquid vessel more than once for placement of sensors. Typically, a liquid vessel is penetrated at least once for each sensor. The combined housing and electrical operating characteristics of the present invention provide a reduced potential for damage from the effects of corrosion on the sensor body.

The controller associated with the present invention incorporates an inherent time delay in a control circuit. The time delay acts to prevent rapid cycling of circuit control relays due to liquid movement.

In one preferred embodiment an inherent adjustment for different fluid resistivities is provided. Thus, different sensors are not automatically required for use with different liquids. In the integral liquid level and temperature sensor the sensors allow control from input received associated with two variables, i.e., both temperature and liquid level.

While specific embodiments have been shown and described, many variations are possible. The particular shape of the sensor housing including dimensions may be changed as desired to suit the equipment with which it is used. The conductive housing and insulating layer materials may vary. The configuration and number of level sensor electrodes may vary although the presently preferred embodiments are illustrated. The control circuit may vary without departing from the scope or spirit of the present invention. Use of a high frequency alternating current, approximately 10K Hz or more, would depend upon the actual material where the sensor is placed. A higher frequency than standard frequency of 50 or 60 Hz could reduce the effect of electrolysis.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A controller for receiving sensor output from an integral temperature and liquid level sensor and controlling a liquid level and the temperature of the liquid, the controller comprising:

means for receiving an input information signal from an integral temperature and liquid sensor means, the input information signal corresponding to a liquid level signal generated by a conductive portion of a housing of the integral temperature and liquid level sensor and a liquid temperature signal generated by a temperature sensor within the housing portion of the integral temperature and liquid level sensor;

a power source for providing power for a controller and a liquid level sensor;

the controller including means for providing a temperature set point;

means for processing the input information signals corresponding to the liquid level signal and the temperature signal;

means for energizing a heater when the integral temperature and liquid level sensor input signals to the controller correspond to the liquid level signal and the temperature signal from the sensor indicating a liquid temperature below the set point and a liquid level sufficient to complete a circuit including the conductive portion of the housing of the integral temperature and liquid level sensor resulting in the conductive portion of the housing providing the signal corresponding to the liquid level;

means for de-energizing the heater when the integral temperature and liquid level sensor input signal to the controller corresponds to either the liquid level signal from the sensor indicating a liquid level below the conductive portion of the housing providing the signal corresponding to the liquid level or the temperature signal to the controller from the temperature sensor within the housing portion of the integral temperature and liquid level sensor corresponds to a liquid temperature above the set point.

2. A controller as set forth in claim further comprising:

a liquid refill valve; and means for energizing the liquid refill valve when the integral temperature and liquid level sensor input signals to the controller from the integral temperature and liquid level sensor correspond to a condition in which the liquid temperature is below the set point and the liquid level is below the conductive portion of the housing providing the signal corresponding to the liquid level.

3. A controller as set forth in claim 1 wherein the temperature set point is adjustable.

4. A controller as set forth in claim 1 wherein timer means introduces a time delay to prevent rapid cycling of the signals generated by the integral temperature and liquid level sensor for input to the controller means which can occur due to movement of the liquid relative to the conductive portion of the housing providing signal corresponding to the liquid level.

5. A controller as set forth in claim 4 wherein the timer means time delay is adjustable.

6. A controller as set forth in claim 1 wherein the controller power source provides a relatively high frequency and low voltage sensor operating characteristic, wherein the chosen frequency range reduces the effect of electrolysis.

7. A controller as set forth in claim 6 wherein the frequency is at least 10K HZ.

8. A process control method for receiving an output from an integral temperature and liquid level sensor as an input to the process control method, the integral temperature and liquid level sensor including an integral temperature sensor within a housing portion and a liquid level sensor including a conductive housing portion of the integral temperature and liquid level sensor, the steps of the method comprising:

providing an integral temperature and liquid level sensor, the integral temperature and liquid level sensor including a housing having conductive portions and a temperature sensor within the housing;

generating a temperature information input signal based upon a fluid temperature sensed by the temperature sensor within the housing;

generating a liquid level signal based upon immersion of at least a portion of the conductive portion of the housing of the integral temperature and liquid level sensor in a liquid;

providing a power source for the integral temperature and liquid level sensor means and an associated process controller;

providing the associated process controller with a temperature set point;

transmitting the temperature and liquid level signals from the integral temperature and liquid level sensor to the process controller;

processing the temperature and liquid level signals;

energizing a heater when the temperature and liquid level signals from the integral temperature and liquid level sensor to the process controller corresponds to a liquid temperature below the temperature set point and a liquid level sufficient to close a circuit including the conductive portion of the housing of the integral temperature and liquid level sensor; and de-energizing the heater when either the temperature and liquid level signals from the integral temperature and liquid level sensor means corresponds to a liquid temperature above the provided temperature set point, or the liquid level signal from the integral temperature and liquid level sensor corresponds to a liquid level sufficiently below the conductive portion of the housing of the integral temperature and liquid level sensor so that the circuit including the conductive portion of the housing of the integral temperature and liquid level sensor is open.

9. A method as set forth in claim 8 further comprising:

energizing a liquid refill valve when the input signal corresponds to a condition in which the liquid temperature is below the set point and the liquid level is insufficient to close the circuit including the conductive portion of the housing of the integral temperature and liquid level sensor.

10. A method as set forth in claim 8 including the step of adjusting the temperature set point.

11. A method as set forth in claim 8 including the steps of:

introducing a time delay in the process controller; and preventing rapid cycling of the heater due to fluctuating liquid level signals from the integral temperature and liquid level sensor which can occur due to movement of the liquid relative to the conductive portion of the housing of the integral temperature and liquid level sensor that does not correspond to a change in the level of the liquid being sensed.

12. A method as set forth in claim 11 including the step of adjusting the length of the time delay.

13. A method as set forth in claim 8 including the steps of:

operating the power source at a relatively high frequency;
operating the integral temperature and liquid level sensor at a relatively low voltage; and
selecting a frequency range for the power source so as to reduce the effect of electrolysis.

14. A method as set forth in claim 13 including the step of selecting a frequency of at least 10K HZ.

* * * * *

UNITED STATES PATENT AND TRADEMARK OFFICE
CERTIFICATE OF CORRECTION

PATENT NO. : 5,178,009
DATED : Janary 12, 1993
INVENTOR(S) : Anil K. Arekapudi, Donald G. Bryan and Thomas Holden It is certified that error appears in the above-indentified patent and that said Letters Patent is hereby corrected as shown below:

Column 3, line 52, after "sections" please insert --of--.

Signed and Sealed this

Eighth Day of March, 1994

Attest:

BRUCE LEHMAN

Attesting Officer

Commissioner of Patents and Trademarks